No. 854,730. PATENTED MAY 28, 1907.
J. J. FRANK & J. S. PEVEAR.
CONTROL OF ELECTRIC CARS.
APPLICATION FILED SEPT. 19, 1906.
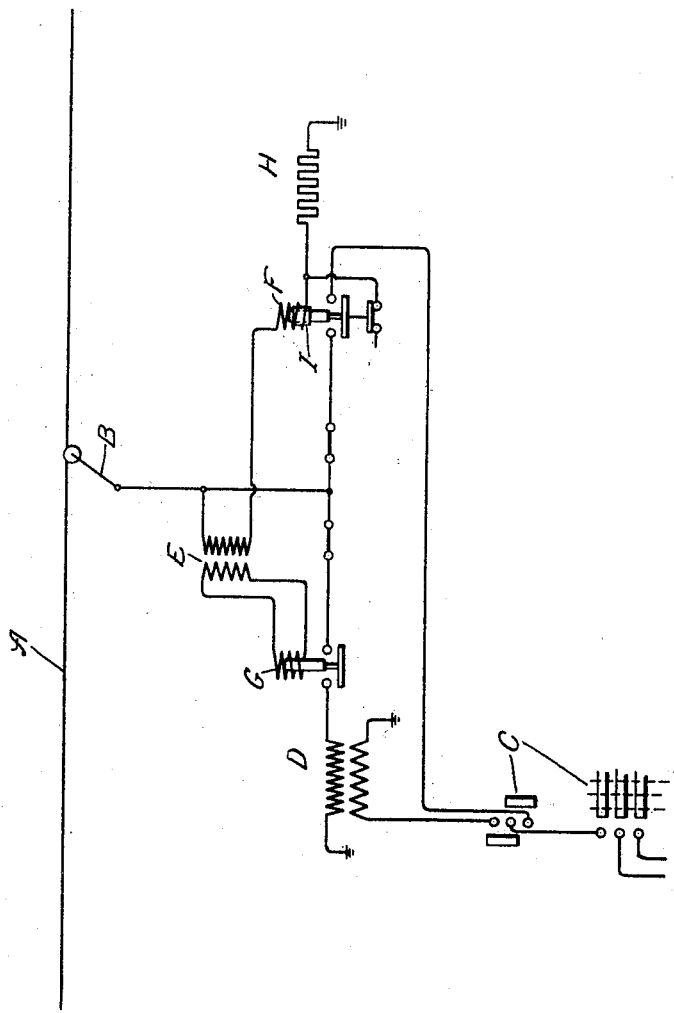
Witnesses:
Inventors:
John J. Frank,
Jesse S. Pevear.
by
Att'y.

UNITED STATES PATENT OFFICE.

JOHN J. FRANK AND JESSE S. PEVEAR, OF SCHENECTADY, NEW YORK, ASSIGNORS TO GENERAL ELECTRIC COMPANY, A CORPORATION OF NEW YORK.

CONTROL OF ELECTRIC CARS.

No. 854,730.  Specification of Letters Patent.  Patented May 28, 1907.

Application filed September 19, 1906. Serial No. 335,234.

*To all whom it may concern:*

Be it known that we, JOHN J. FRANK and JESSE S. PEVEAR, citizens of the United States, residing at Schenectady, county of Schenectady, State of New York, respectively, have invented certain new and useful Improvements in Control of Electric Cars, of which the following is a specification.

Our invention relates to the control of motor-driven cars designed for operation on both alternating and direct-current. Such cars are ordinarily arranged for a direct connection between the trolley and motor controller for direct-current operation, and an inductive connection comprising a transformer between the trolley and motor-controller for alternating-current operation. It is frequently desirable that the transition from direct to alternating-current connections should be made automatically when the car runs from a direct-current trolley section to an alternating-current section, or vice versa. For this purpose it has been proposed heretofore to employ magnetically-actuated switches with selective means for actuating one magnet or the other, according to the kind of current received from the trolley.

Our invention consists in employing a small transformer for selectively controlling both switch-operating magnets. We accomplish this by connecting the primary of the small transformer in shunt to the motor-circuit, and connecting one magnet winding in series with the transformer primary and the other in series with the transformer secondary. When the trolley engages a direct-current section of the trolley-wire, the direct-current does not affect the magnet winding in series with the transformer secondary, but actuates the magnet winding in series with the transformer primary. Alternating-current, on the other hand, will actuate the magnet winding in series with the transformer secondary, while the transformer primary acts as a choke-coil to prevent sufficient current flowing through the magnet-winding in series with it to actuate it.

Our invention will best be understood by reference to the accompanying drawing, which shows diagrammatically an arrangement of automatic selective devices arranged in accordance with our invention.

In the drawings, A represents the trolley-wire, or other supply-conductor, and B the trolley, or other current-collecting device.

C represents the motor-controlling switches which, for direct-current operation are to be connected directly to the trolley B and for alternating-current operation are to be connected to the trolley inductively through the transformer D.

E represents a small step-down transformer having its primary connected between trolley and ground in shunt to the motor-circuit.

F represents a magnet-winding in series with the primary of transformer E controlling a contact which, when magnet F is energized, establishes a direct connection from trolley B to switches C.

G represents a second magnet winding which is in series with the secondary of transformer E, and which controls a contact arranged to close a circuit from the trolley B to ground through the primary of transformer D. When direct-current is flowing through the trolley-wire, magnet winding G is not actuated, while magnet winding F is energized by a sufficiently strong current to raise its contacts, connecting the trolley B directly to motor-controller C for direct-current operation. The contacts controlled by this magnet winding are also arranged to cut a resistance H into circuit with the magnet winding so as to reduce the current-flow after the switch-contacts have been closed. When alternating-current is flowing through the trolley B, magnet G is actuated, while the current through magnet F is not sufficient to actuate it on account of the high impedance in its circuit formed by the primary of transformer E.

In order to prevent the possibility of the switch F being actuated in case of a short-circuiting of the primary transformer E when the trolley is on an alternating-current section, or of an abnormal flow of alternating-current from any other cause, a short-circuited band I may be placed on the core of the operating magnet of this switch. This will not affect the operation of the switch on direct-current, but will damp out any alternating flux so as to prevent its operation on alternating-current if for any reason an excessive amount of alternating-current should flow through the magnet.

We do not desire to limit ourselves to the particular construction and arrangement of parts here shown, but aim in the appended claims to cover all modifications which are within the scope of our invention.

What we claim as new, and desire to secure by Letters Patent of the United States, is,—

1. In an electric car designed for operation on both alternating and direct-current, a transformer in shunt to the power-circuit of the car, two magnet windings connected respectively in series with the primary and secondary windings of the transformer, and switch-contacts controlled by said windings arranged to connect the power-circuit of the car for operation on direct and alternating-current respectively.

2. In an electric car designed for operation on both alternating and direct-current, a current-collecting device, a motor-controller, a direct connection from said device to said controller, an inductive connection from said device to said controller comprising a transformer, a small transformer connected to said device in shunt to the motor circuit, a magnet winding in series with the primary of the small transformer, a switch-contact controlled thereby in said direct-connection, a magnet winding in series with the secondary of the small transformer, and a switch contact controlled thereby in said inductive connection.

3. In a motor car designed for operation on both alternating and direct-current, a transformer in shunt to the power-circuit of the car, two magnet windings connected respectively in series with the primary and secondary windings of the transformer, switch contacts controlled by said windings arranged to connect the power-circuit of the car for operation on direct and alternating-current respectively, and a switch-contact controlled by the magnet in the primary circuit for cutting a resistance into said circuit.

In witness whereof, we have hereunto set our hands this 17th day of September, 1906.

JOHN J. FRANK.
JESSE S. PEVEAR.

Witnesses:
BENJAMIN B. HULL,
HELEN ORFORD.